(12) United States Patent
Hagen et al.

(10) Patent No.: US 8,220,841 B2
(45) Date of Patent: Jul. 17, 2012

(54) CONNECTION DEVICE FOR MEDIUM CONDUITS

(75) Inventors: Harald Hagen, Wipperfürth (DE); Andreas Suhr, Köln (DE); Reiner Mitterer, Wipperfürth (DE)

(73) Assignee: Voss Automotive GmbH, Wipperfurth (DE)

( * ) Notice: Subject to any disclaimer, the term of this patent is extended or adjusted under 35 U.S.C. 154(b) by 980 days.

(21) Appl. No.: 11/916,830

(22) PCT Filed: Jun. 6, 2006

(86) PCT No.: PCT/EP2006/062940
§ 371 (c)(1),
(2), (4) Date: Dec. 7, 2007

(87) PCT Pub. No.: WO2006/131521
PCT Pub. Date: Dec. 14, 2006

(65) Prior Publication Data
US 2009/0127847 A1    May 21, 2009

(30) Foreign Application Priority Data
Jun. 9, 2005   (DE) .................... 20 2005 009 018 U

(51) Int. Cl.
*F16L 25/00* (2006.01)
(52) U.S. Cl. ......... 285/331; 285/104; 285/308; 285/321
(58) Field of Classification Search .......... 285/104–105, 285/111, 243, 308, 316–317, 319, 322, 331, 285/113, 321
See application file for complete search history.

(56) References Cited

U.S. PATENT DOCUMENTS

| | | | | |
|---|---|---|---|---|
| 4,431,216 A | * | 2/1984 | Legris | 285/104 |
| 4,453,747 A | | 6/1984 | Bimba et al. | |
| 4,721,331 A | * | 1/1988 | Lemelshtrich | 285/305 |
| 4,813,716 A | * | 3/1989 | Lalikos et al. | 285/148.14 |
| 4,878,697 A | * | 11/1989 | Henry | 285/250 |
| 5,211,427 A | * | 5/1993 | Washizu | 285/23 |
| 5,711,550 A | | 1/1998 | Brandt et al. | |
| 5,860,677 A | | 1/1999 | Martins et al. | |

FOREIGN PATENT DOCUMENTS

| | | |
|---|---|---|
| DE | 20214847 | 2/2004 |
| EP | 0733844 B1 | 3/1996 |
| GB | 2255827 | 11/1992 |

* cited by examiner

*Primary Examiner* — Aaron Dunwoody
*Assistant Examiner* — Fannie Kee
(74) *Attorney, Agent, or Firm* — Brinks Hofer Gilson & Lione

(57) ABSTRACT

A connection device for the plug connection of at least one media line includes a housing part with at least one reception orifice for plugging in a plug portion connected or connectable to the at least one media line. The housing part includes a basic part and an insert part. The basic part is releasably connected with a form fit to the insert part via a latching connection. The latching connection holds the insert part releasably and is formed by a C-shaped spring clip which is seated on the outside of the basic part and engages with at least one latching extension radially through an orifice of the basic part into a circumferential latching groove of the insert part.

27 Claims, 7 Drawing Sheets

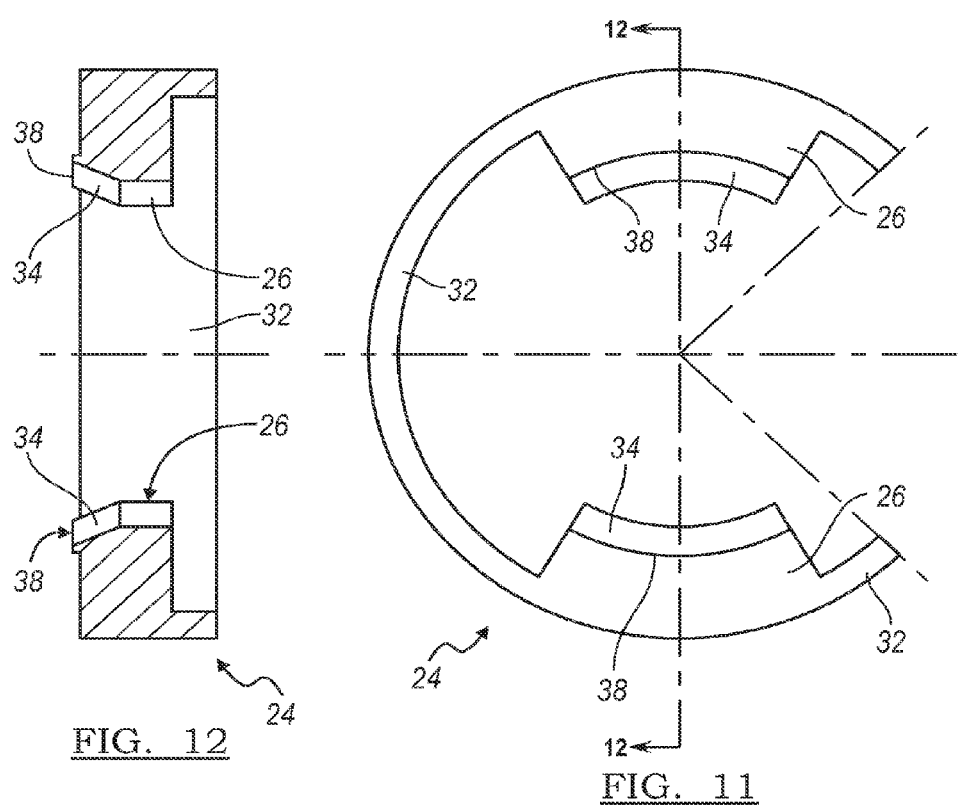
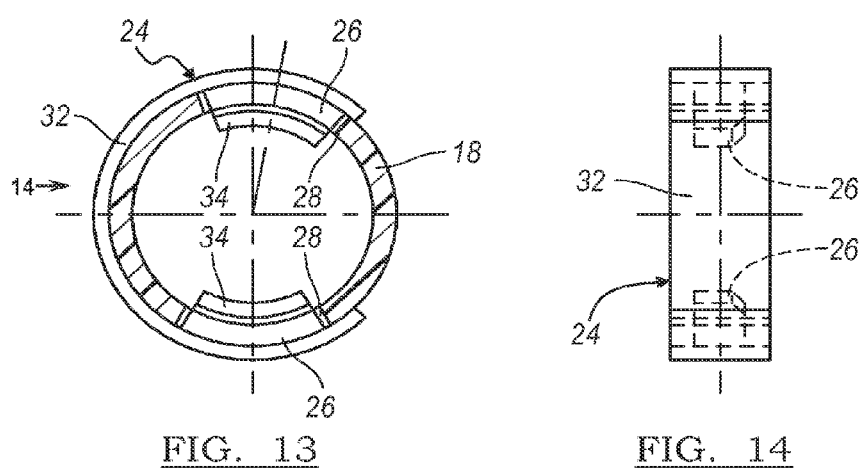
FIG. 12
FIG. 11
FIG. 13
FIG. 14

CONNECTION DEVICE FOR MEDIUM CONDUITS

CROSS REFERENCE TO RELATED APPLICATIONS

The application claims priority to PCT/EP/2006/062940 filed on Jun. 6, 2006 and German Utility Model DE 20 2005 009 018.2 filed Jun. 9, 2005.

FIELD OF THE INVENTION

The present invention relates to a connection device for the plug connection of at least one media line (pipeline or hose line for gases or liquids).

BACKGROUND OF THE INVENTION

A connection device of this type is known from EP 0 733 844 B1. In EP 0 733 844 B1, the insert part consists of a one-piece plastic molding which, for the purpose of the releasability of the plugged-in plug portion detained by the clamping ring against being pulled out and formed by one line end, has two elastic latching arms which engage radially with latching extensions into the basic part and into latching orifices formed there. Each latching arm has an actuation portion projecting outward from the basic part. Consequently, the insert part can be released from the basic part, so that the plug portion, with the clamping ring seated on it, can then also be removed jointly with the insert part. Although very simple manual release is possible here, the projecting actuation extensions of the latching arms may nevertheless cause an obstruction or even lead to unwanted release. Moreover, the type of latching at the insert part during assembly requires an exact alignment in the circumferential direction, so that the latching extensions can be introduced correctly into the latching orifices.

A further connection device of the generic type is described in the publication DE 202 14 847 U1. In DE 202 14 847 U1, the insert part can be plugged completely into the basic part. For latching, the insert part has on its outer circumference radial latching extensions which latch radially in each case into a corresponding latching orifice of the basic part. The latching orifices are in this case designed as radial through orifices, so that, for release, the latching extensions can be reached from outside by means of a suitable tool and moved radially inward, with the result that the plug portion, together with the clamping ring and with the insert part, can be removed. Although high reliability against unwanted release is achieved here, release is in this case nevertheless possible only by means of a suitable auxiliary tool. Moreover, even here, on account of the configuration of the insert part, assembly is possible only in a defined rotary orientation.

SUMMARY OF THE INVENTION

The object on which the present invention is based is to improve a connection device of the type mentioned, such that the assembly of the individual parts is simplified and a simple manual releasability of the previously plugged-in plug portion detained via the clamping ring is ensured, while at the same time there is high reliability against unwanted release.

Thus, according to the invention, the latching connection holding the insert part releasably in the basic part is formed by a C-shaped spring clip which is seated on the outside manually releasably (removably) on a sleeve-shaped hollow-cylindrical portion of the basic part and engages with at least one latching extension radially inward (in each case) through an orifice of the basic part into a circumferential latching groove of the insert part. Preferably, two latching extensions lying essentially diametrically opposite one another are provided, each latching extension having an oblique face on its front side facing the plug-in side of the reception orifice, in such a way that, when the insert part is being introduced into the basic part, each latching extension is urged radially outward via its oblique face, along with the spring-elastic deformation of the spring clip, and subsequently latches into the latching groove as a result of the spring-elastic back deformation of the spring clip. Since the spring clip surrounds the basic part over a defined surrounding angle and is in this case preferably seated in an outer annular groove of the basic part, high reliability against unwanted release is achieved due to the avoidance of projecting parts. At the same time, however, the spring clip can be removed very simply manually, without a tool, by being spread open, so that the plug portion, together with the clamping ring and with the insert part, can then be removed from the basic part. If required, the clamping ring can then be detached from the plug portion, so that the plug portion can also be removed from the insert part.

Advantageously, by virtue of the invention, the insert part is a rotationally symmetrical part which can be inserted into the basic part in any desired rotary orientation, because the latching extensions of the spring clip can in any event engage into the outer circumferentially continuous latching groove of the insert part. This also simplifies the assembly of the connection device since a rotary orientation of the insert part before insertion is unnecessary.

In an advantageous development of the invention, additional securing means against an unwanted release of the spring clip in the operating state of the connection device are provided. In actual fact, for this purpose, the spring clip has, on the front side of each latching extension, a web-like securing portion which, when an axial releasing pull occurs, engages radially and axially behind the associated orifice of the basic part such that the spring clip is blocked against spreading open radially. In this state, the spring clip can no longer be removed even manually. For release, first, a movement of the spring clip in the plug-in direction must take place, in order to remove the securing portions from their engagement position and so that the spring clip can then be spread open radially.

Furthermore, there is preferably provision for the connection device to be suitable universally both for the direct connection of a media line by a cylindrical line end being plugged in and for indirect line connection via a separate plug part. The plug part may then have, in the region of its plug portion, a holding groove for the form-fit engagement of the clamping ring. For this purpose, there is provision for the clamping ring, in cooperation with the inner cone and in terms of its geometry, to be designed, in the region of a radially inwardly pointing tooth edge, in such a way that the plug portion may be designed selectively with at least one holding groove for the form-fit engagement of the tooth edge or the smooth cylindrical circumferential face for the form-fit or forcible form-fit engagement of the tooth edge.

Further advantageous design features are explained in more detail below.

DESCRIPTION OF THE DRAWINGS

The invention will be explained in more detail below by means of a preferred exemplary embodiment illustrated in the drawing in which:

FIG. 1 shows a perspective view of a connection device according to the invention without a plugged plug portion or plug portion to be plugged in, FIG. 11 shows a greatly enlarged axial front view of a spring clip according to the invention, FIG. 12 shows a diametral cross section in the plane 12-12 according to FIG. 11, FIG. 13 shows a diagrammatic cross-sectional view of the basic part in the region of the spring clip in a design variant, FIG. 14 shows a side view of the spring clip in the direction of the arrow 14 according to FIG. 13.

DETAILED DESCRIPTION OF THE INVENTION

Figure 1:
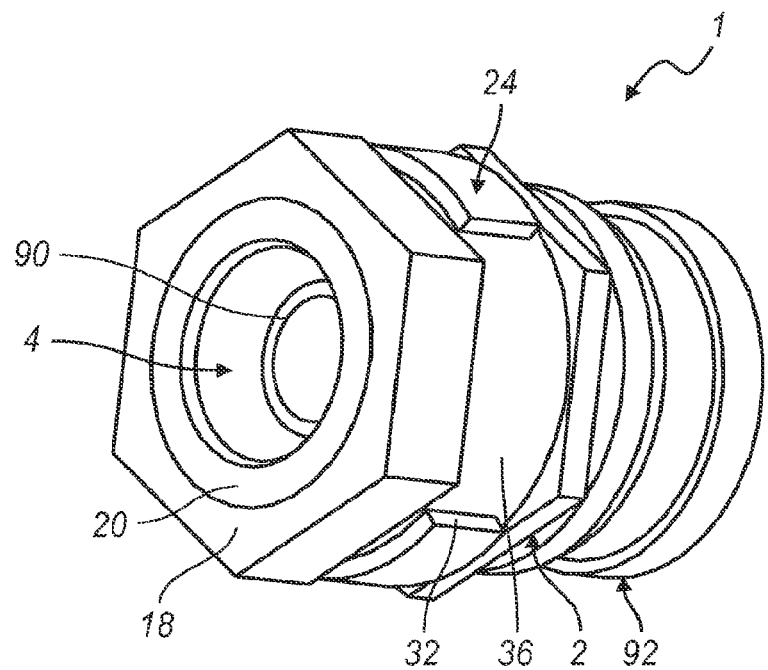

In the various figures of the drawing, identical parts are always given the same reference symbols, and therefore any description of a part which may possibly occur only once with reference to a specific drawing figure also applies similarly to the other drawing figures in which the part with the corresponding reference numeral can likewise be seen.

Figure 2:
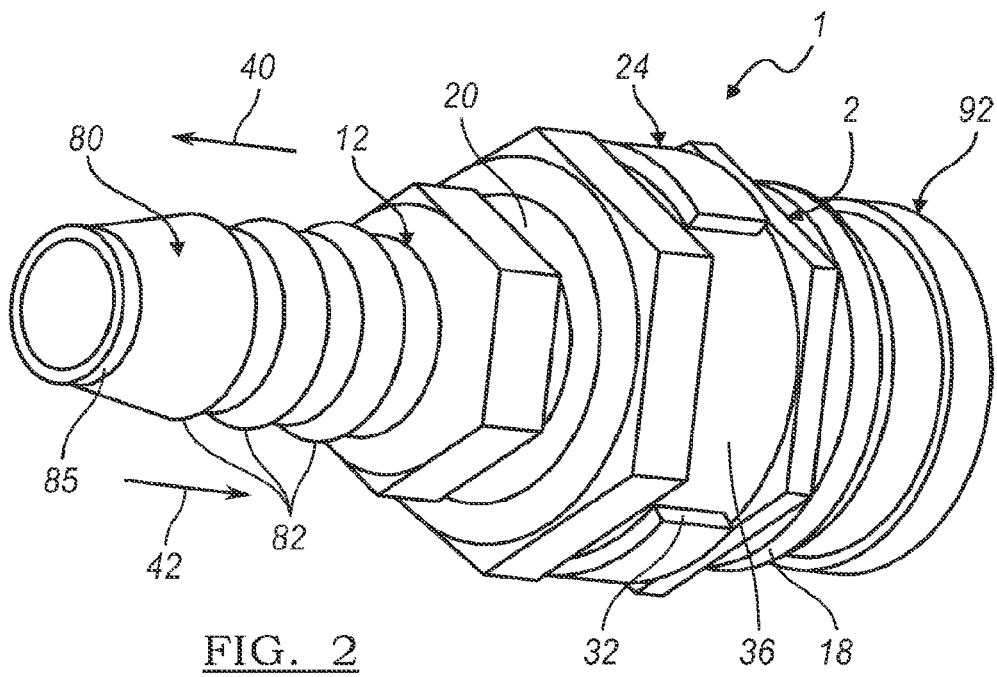
FIG. 2 shows a perspective view, as in FIG. 1, but with a plugged-in plug portion, here, for example, in the form of a separate form plug for the indirect connection of a media line, not illustrated.

A connection device 1 according to the invention comprises a housing part 2 with (at least) one reception orifice 4, open on one side (toward the plug-in side), for axially plugging in an essentially hollow-cylindrical plug portion 6 and a clamping ring 8, arranged in the housing part 2 or in the reception orifice 4 (see FIG. 1), for detaining the plug portion 6 plugged in axially, that is to say in the direction of a plug axis 10. According to FIGS. 2 and 3, the plug portion 6 may be an integral part of a separate form plug 12, via which a media line can be connected indirectly. According to FIG. 4, however, the plug portion 6 may also be formed by one end of a media line 14, so that the media line 14 can be plug-connected directly to the connection device 1.

In both instances, the connection device 1 makes it possible to have a simple and quick plug connection simply by plugging the plug portion 6 into the housing part 2 without any other assembly steps. In this case, the clamping ring 8 is seated in a widening of the reception orifice 4 in such a way that it surrounds the reception orifice 4 and consequently the plugged-in plug portion 6. To detain the plugged-in plug portion 6, the clamping ring 8 cooperates with an inner cone 16 of the housing part 2 in such a way that, in the event of a movement in a direction (release direction, arrow 40) opposite to the plug-in direction (arrow 42), the clamping ring 8 is narrowed radially elastically via the inner cone 16 and then acts with a form fit or a forcible form fit against the plug portion 6. The plug portion 6 is then detained against being pulled out.

For the purpose of a subsequent release of the plug portion 6 and also for the purpose of the producibility or assemblability of the connection device 1, the housing part 2 is formed in two parts from a basic part 18 and from an insert part 20 having the inner cone 16 for the clamping ring 8. In this case, the insert part 20 can be plugged into the basic part 18 and be releasably connected to the latter with a form fit via a latching connection 22. This is a snappable form-fit connection with an active-area undercut angle $\geqq 90°$ C.

Figure 5:
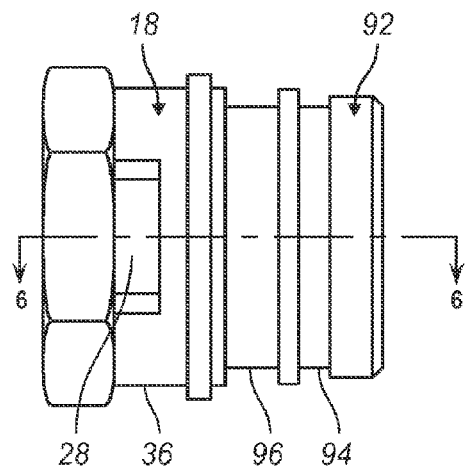
FIG. 5 shows a side view of the basic part.
Figure 6:
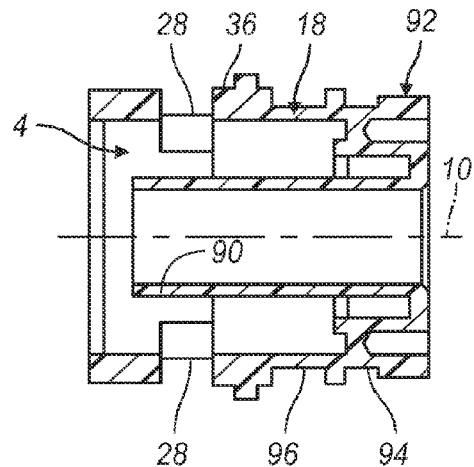
FIG. 6 shows an axial section through the basic part in the plane 6-6 according to FIG. 5.
Figure 7:
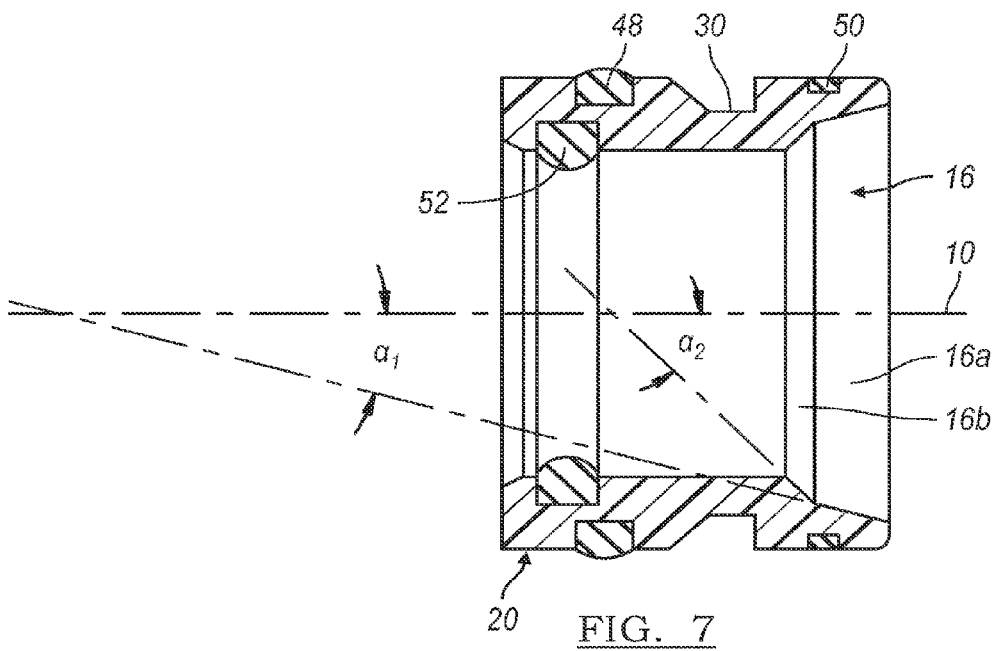
FIG. 7 shows an enlarged axial section through the insert part.

According to the invention, the latching connection 22 holding the insert part 20 releasably in the basic part 18 is formed by a C-shaped spring clip 24 (see, in this respect, also the separate illustrations in FIGS. 11 to 14) which is seated on the outside manually releasably (removably) on the basic part 18 and which engages with preferably two latching extensions 26 radially through orifices 28 of the basic part 18 (see FIGS. 5 and 6) into a circumferential latching groove 30 of the insert part 20 (see, in this respect, also FIG. 7).

As may be gathered from FIGS. 11 to 14, the spring clip 24 comprises a C-shaped spring-elastic annular portion 32 and preferably two latching extensions 26 lying essentially diametrically opposite one another. The annular portion 32 is of essentially strip-shaped design and extends in the circumferential direction over an angle of about 270° according to FIG. 11. An orifice of about 90° therefore remains, with the result that it is possible in a simple way to place the spring clip 24 onto the basic part 18 and also in a simple way to remove it from the latter, in each case in a radial direction, said spring clip at the same time being spread open elastically. The latching extensions 26 may themselves extend, for example, over about 60° in the circumferential direction. On their front sides facing the plug-in side of the reception orifice 4, the latching extensions 26 have oblique faces 34, in such a way that, when the insert part 20 is being introduced into the basic part 18, the latching extensions 26 are urged radially outward via the oblique faces 34 and subsequently latch into the latching groove 30 as a result of the spring elasticity of the annular portion 32. The spring clip 24 is preferably seated with its annular portion 32 in an outer annular groove 36 of the basic part 18. In a preferred embodiment, in this case, there is provision for the latching extensions 26 to be designed or arranged asymmetrically in relation to the annular groove 36 and to the annular portion 32 in the axial and/or circumferential direction, in such a way that the spring clip 24 can be placed onto the basic part 18 in only one correct orientation with respect to the oblique faces 34. In this case, of course, the radial orifices 28 of the basic part 18 are adapted correspondingly to the arrangement or configuration of the latching extensions 26.

Figure 3:
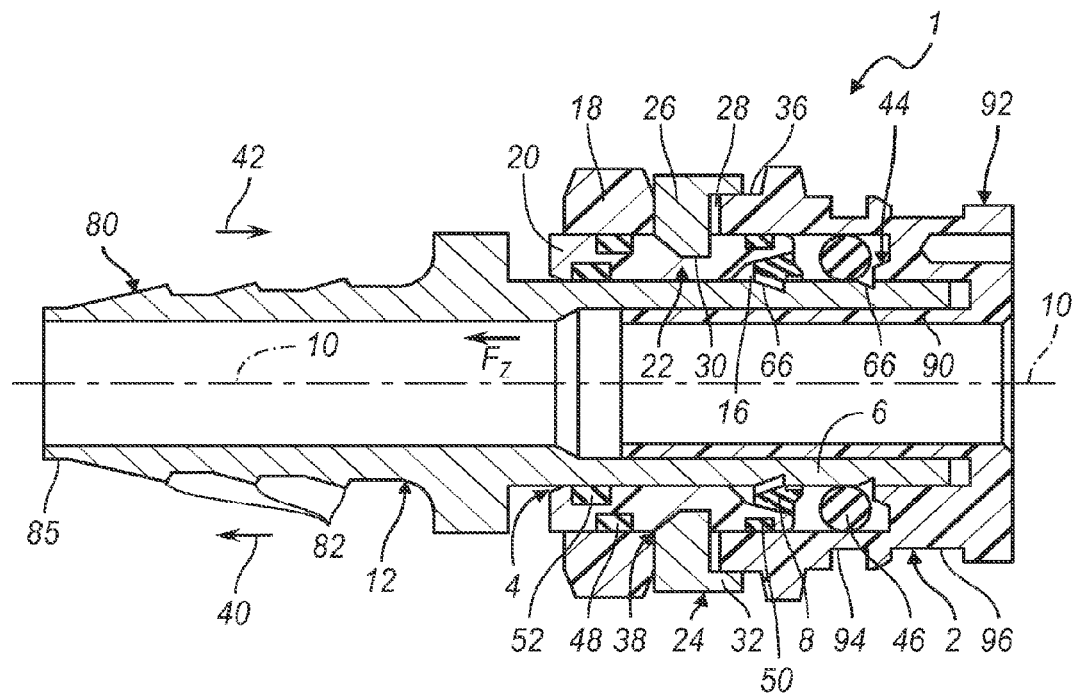
FIG. 3 shows a longitudinal section through the connection device according to FIG. 2 with the plugged-in plug portion.
Figure 4:
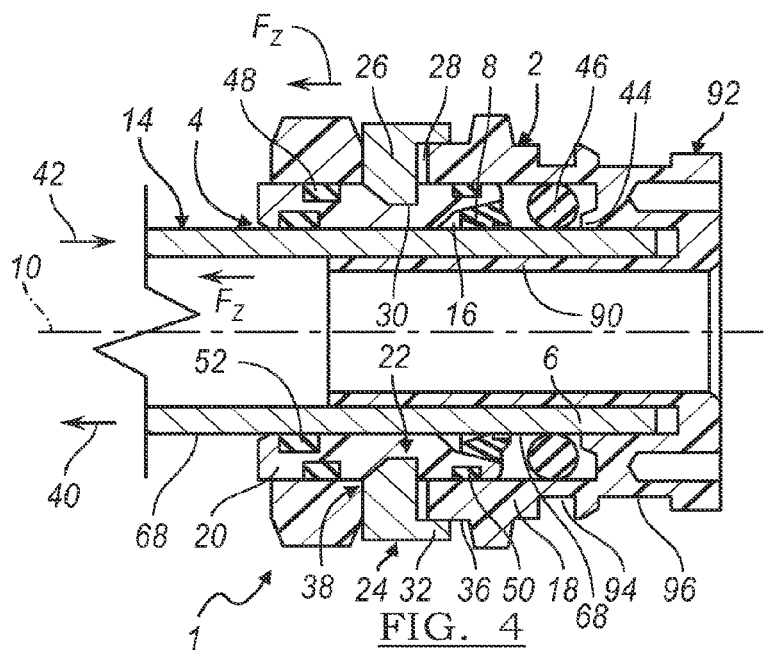
FIG. 4 shows a sectional view, similar to FIG. 3, but with a plugged-in plug portion which is formed directly by a line end.

FIGS. 11 and 12 illustrate the version of the spring clip 24 which is provided in the version of the connection device 1, as illustrated, for example, in FIGS. 3 and 4. In this case, the latching extensions 26 are arranged asymmetrically to the annular portion 32 in the axial direction. According to FIG. 5, the orifices 28, too, are correspondingly formed axially asymmetrically in the annular groove 36 of the basic part 18. According to FIGS. 3 and 4, the spring clip 24 can thereby be inserted into the annular groove 36 in any orientation.

In a design variant illustrated in FIGS. 13 and 14, the latching extensions 26 may also be arranged symmetrically with respect to the annular portion 32, in which case the latching extensions 26 are designed or arranged asymmetrically in the circumferential direction. According to FIG. 13, there is additionally provision for the latching extensions 26 to differ from one another in terms of the extent of their circumferential angle. In this case, too, the orifices 28 of the basic part 18 are adapted correspondingly. This alternative version, too, rules out an incorrect assembly of the spring clip 24.

In a further advantageous embodiment of the invention, additional securing means against an unwanted release or removal of the spring clip 24 in an operating state of the connection device 1 in which it is acted upon by an internal system pressure are provided. In the example illustrated, see particularly FIGS. 11 and 12, for this purpose, the spring clip 24 has, on the front sides of the latching extensions 26, web-like securing portions 38 which, when a releasing pull $F_Z$ acting axially in the release direction (arrow 40) of the plug portion 6 arises, by virtue of an axial driving movement of the spring clip 24 via the clamping ring 8 and the insert part 20, engage radially and axially behind the associated orifices 28 of the basic part 18 such that the spring clip 24 is blocked against spreading open radially. This state is illustrated in FIGS. 3 and 4. For release, first, a movement in the plug-in direction (arrow 42) out of this blocking position must take place, in order to move the spring clip 24 through an axial movement play into a freeing position in which the spring clip 24, together with the securing portions 38, can be removed radially. In this case, of course, the axial movement play of the latching extensions 26 within the orifices 28 must be dimensioned such that, in the freeing position, the latching extensions 26, together with the securing portions 38, can be led outwards through the orifices 28.

As may be gathered, further, from FIGS. 3 and 4, a circumferential seal 46, which is preferably formed by an O-ring, is arranged as an actual media seal (main seal) in the reception orifice 4 of the housing part 2 in a space located axially between the insert part 20 with the clamping ring 8 and a counterface 44 lying at a lower area in the reception orifice 4. Moreover, in addition, a sealing arrangement for sealing off against the penetration of dirt and the like is provided. For this purpose, the insert part 20 has two outer circumferential seals 48 and 50, arranged axially on both sides of the latching groove 30, for coming to bear sealingly against the inner face of the basic part 18 axially on both sides of the orifices 28. Furthermore, the insert part 20 has, in the region of its mouth on the plug-in side, an inner circumferential seal 52 for coming to bear sealingly on the plugged-in plug portion 6. In the preferred embodiment (see, in particular, FIG. 7), the insert part 20, together with the circumferential seals 48, 50 and 52, is formed as a multicomponent molding from plastic. In this case, the actual insert part 20 comprises a relatively harder and more resistant plastic material, while the regions of the circumferential seals 48, 50, 52 comprise a more elastic plastic material injection-molded on.

Alternatively to this preferred version, however, it is likewise possible to use separate sealing rings which should then be seated in corresponding annular grooves of the insert part 20. Moreover, the circumferential seal 48 could be dispensed with, so that only the circumferential seal 50 would be present for sealing off against dirt with respect to the region of the clamping ring 8 and to the circumferential seal 46.

As may be gathered, further, from FIG. 7, the inner cone 16 of the insert part 20 preferably comprises two axially adjacent inner cone portions 16a and 16b with different cone angles. The first inner cone portion 16a, remote from the plug-in side, has a first, flatter cone angle $\alpha_1$, while the second inner cone portion 16b following in the direction of the plug-in side is designed with a second, steeper cone angle $\alpha_2$. According to FIGS. 8 to 10, the clamping ring 8 correspondingly has an outer cone 54 with two axially adjacent outer cone portions 54a and 54b in adaptation to the inner cone portions 16a, 16b of the insert part 20 (with cone angles $\alpha_3$ and $\alpha_4$ corresponding to cone angles $\alpha_1$ and $\alpha_2$ respectively). In the preferred exemplary embodiment, the first cone angle $\alpha_1$ and cone angle $\alpha_3$ lie in the range of 10° to 25°, in particular at about 15°. The second cone angle $\alpha_2$ and cone angle $\alpha_4$ preferably lie in the range of 40° to 50°, in particular at about 45°.

Figure 8:
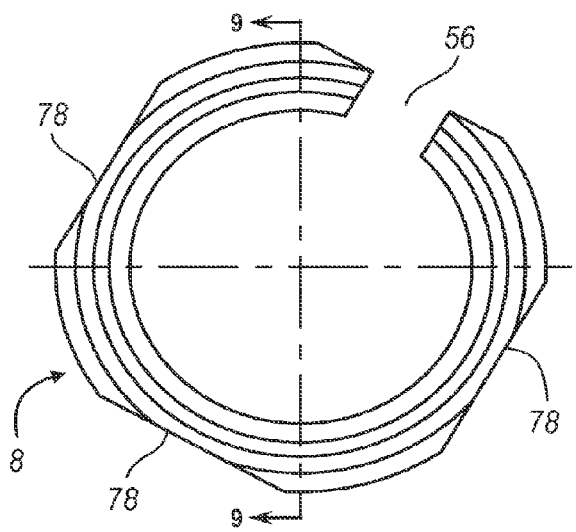
FIG. 8 shows a greatly enlarged axial view of a clamping ring.

According to FIG. 8, the clamping ring 8 is formed as an annular body, in particular of metal and has a continuous slot interruption 56 at one circumferential point, with the result that the clamping ring 8 is deformable radially elastically. According to FIGS. 9 and 10, the clamping ring 8 has a radially inwardly pointing tooth edge 58, the diameter of which, in an expanded, not elastically deformed state of the clamping ring 8, is smaller than the outside diameter of the plug portion 6 to be plugged in. In this case, the tooth edge 58 is formed by a sawtooth-like tooth profile 60 between a conical front face 62 and a radial rear face 64 (see, in particular, FIG. 10).

Figure 18:
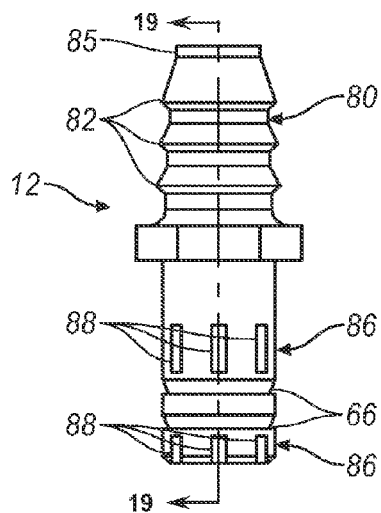
FIG. 18 shows a side view of a form plug for indirect line connection.
Figure 19:
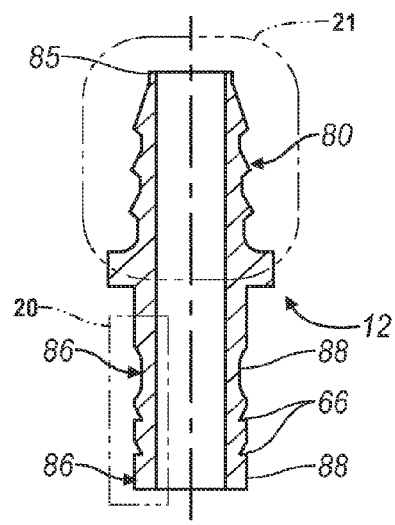
FIG. 19 shows an axial section in the plane 19-19 according to FIG. 18.
Figure 20:
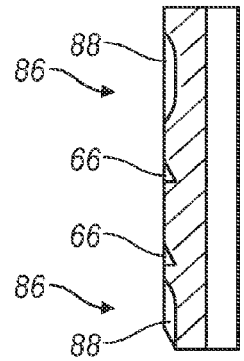
FIG. 20 shows an enlarged illustration of the region 20 in FIG. 19.

By virtue of this configuration described, when the plug portion 6 is being plugged in over the conical front face 62, first, the clamping ring 8 is slightly spread open radially (being supported axially on the circumferential seal 46), until the plug portion 6 can be plugged through the clamping ring 8. The clamping ring 8, by virtue of its tooth edge 58, is then first seated forcibly on the circumference of the plug portion 6. As a result, in the event of a pull in the release direction 40, the clamping ring 8 is driven forcibly, until its outer cone 54 comes to bear in the inner cone 16 of the housing part 2 or of the insert part 20. With a continuing pull, a radially inwardly directed force is generated via the cones 16, 54, as a result of which force the clamping ring 8 is narrowed elastically, so that the tooth edge 58 engages into the plug portion with a form fit or with a forcible form fit. The plug portion 6 is thereby detained against being pulled out. In this case, then, there is preferably provision for the clamping ring 8 to be designed, in cooperation with the inner cone 16 and with respect to its geometry, in the region of the tooth edge 58, in such a way that the plug portion 6 may be designed selectively with at least one holding groove 66 (see FIG. 3 and, in particular, FIGS. 18 to 20) for the form-fit engagement of the tooth edge 58 or (according to FIG. 4) with a smooth, cylindrical circumferential face 68 for the form-fit or at least forcible form-fit engagement of the tooth edge 58.

In this respect, the above-described embodiment with the two inner cone portions 16a, 16b of the insert part 20 and with the corresponding two outer cone portions 54a, 54b of the clamping ring 8 is of particular importance. Thus, the first, flatter cone portions 16a and 54a bring about a reliable engagement or indentation of the tooth edge 58 into smooth cylindrical plug portions 6, specifically even in the case of relatively high diameter tolerances in the region of the plug portion 6. After the minimum indentation (approximately 0.15 mm) is reached, the change from the flatter to the steeper cone portion takes place. The indentation end position is consequently reached after a shorter axial travel. The indentation end position is reached when the clamping ring 8 bears with its inner circumferential face 76 (see FIGS. 9 and 10) radially against the outer circumferential face of the plug portion 6. The shortened axial travel results in a shorter required axial cone length. Furthermore, due to the shorter axial travel, no inadmissible axial widening of the construction space for the circumferential seal 46 (O-ring) into the region of the inner cone 16 occurs.

Figure 9:
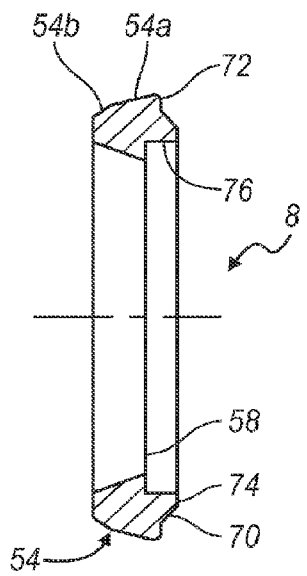
FIG. 9 shows a diametral cross section in the plane 9-9 according to FIG. 8.
Figure 10:
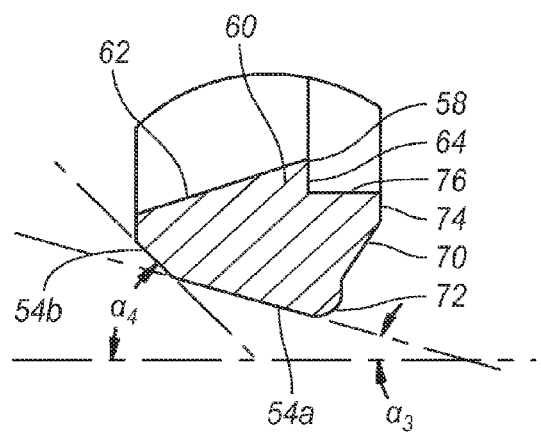
FIG. 10 shows an enlargement of a detail of the cross section according to FIG. 9.

As may be gathered, further, from FIGS. 9 and 10, the clamping ring 8 has, on its rear side pointing in the plug-in direction 42, a bearing contour for the circumferential seal 46 arranged in the reception orifice 4 so as to come to bear sealingly on the plug portion 6. This bearing contour comprises, first, of a slightly conical centering slope 70, via which the clamping ring 8 is centered automatically by bearing against the circumferential seal 46, when said clamping ring is moved axially out of the inner cone 16 when the plug portion 6 is being plugged in. An annular extension 72 is advantageously formed between the centering slope 70 and the adjoining, flatter outer cone portion 54a, in such a way that the outer cone portion 54a is prolonged in the plug-in direction by said annular extension. The centering slope 70 blends inward into a radial annular end face 74. This brings about a protection of the circumferential seal 46 by the avoidance of a sharp edge which would occur, without the radial annular end face 74, between the centering slope 70 and an inner cylindrical circumferential face 76.

In an advantageous embodiment illustrated in FIG. 8, the clamping ring 8 has, in its outer circumferential region, preferably three secant-like flattenings 78, by means of which the ring cross section is reduced zonally such that articulation zones and spring arm portions connected via these are formed as a result. This contributes to improving the radially elastic deformability of the clamping ring 8. As illustrated, the preferably three flattenings 78 are, in particular, arranged so as to be distributed radially symmetrically with respect to the slot interruption 56 and with respect to one another.

Figure 21:
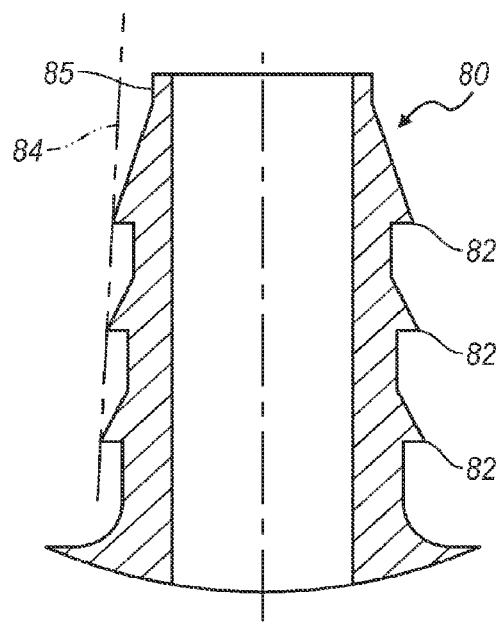
FIG. 21 shows an enlarged part view of the region 21 in FIG. 19.

The form plug 12 (see FIGS. 18 to 21), already mentioned above, which is provided for an indirect connection of the media line 14, has for the line connection a connecting endpiece 80, onto which the line 14 can be plugged. This connecting endpiece 80 has an endpiece profile with a plurality of, for example three, barb-like tooth edges 82. Preferably, in this case, there is provision for the diameters of the tooth edges 82 to increase successively from the free end of the connecting endpiece 80. This results in a "pinetree-like profile", in that an enveloping surface 84 (indicated by dashes in FIG. 21) defined by the outer tips of the tooth edges 82 is formed slightly conically. Owing to this advantageous configuration, the connecting endpiece 80 is situated as a universal endpiece for media lines having different inside diameters. Moreover, the connecting endpiece 80 advantageously has at its free end a short cylindrical portion 85 which makes it easier to introduce it into the media line 14, in that its outside diameter is somewhat smaller than the line inside diameter.

In a further preferred embodiment, the plug portion 6 of the form plug 12 has two axially offset annular grooves 66 for the engagement of the clamping ring 8, on the one hand, in a partially plugged prelatching position and, on the other hand, in a completely plugged full-latching position of the plug portion 6. In this case, in the prelatching position, there is a leak which is limited to a defined extent and, in particular, is perceptible acoustically, while, in the full-latching position, media-tight sealing is ensured. In this case, in the prelatching position, axial leakage paths are formed between the plug portion 6 and each inner circumferential seal 46 and 52, specifically preferably in each case by means of a zone 86 of the plug portion 6 with groove-like depressions 88 running axially and distributed over the circumference.

In an expedient embodiment, the form plug 12 may constitute an adapter between different dimensional systems on the plug side and on the line side.

For example, the plug side may be designed according to SAE in the inch dimension system, so that SAE lines having measurement in inches can also be plugged directly, while the line side may be designed in the metric dimension system according to DIN or else universally or into the special configuration of the connecting endpiece 80 for both dimension systems mentioned.

It also remains to be mentioned that preferably an axial supporting sleeve 90 for forcible engagement into the plugged-in plug portion 6 is arranged within the reception orifice 4. Owing to the supporting sleeve 90, the connection device 1 is also suitable for the direct plug connection of a relatively more flexible hose line, in that the latter is supported radially inward against the radial force of the clamping ring 8 by the supporting sleeve 90. In this case, the basic part 18 is produced, preferably jointly with the supporting sleeve 90, as a one-piece molding from plastic.

Furthermore, in the embodiment illustrated, the housing part 2 is designed as a press-in cartridge with a plug-in portion 92 which can be inserted into a connecting orifice of any desired assembly part, not illustrated. Preferably, this plug-in portion 92 has a slightly conically tapered design and on its outer circumference has, on the one hand, an annular groove 94 for a seal, not illustrated, and, on the other hand, an annular groove 96 for a holding element, likewise not illustrated. In this case, according to FIGS. 5 and 6, the sealing annular groove 94 should lie nearer to that end of the plug-in portion 92 which is to be plugged in than the holding element annular groove 96. As a result, during insertion, damage to the sealing region by the holding element within the reception orifice is avoided.

Figure 15:
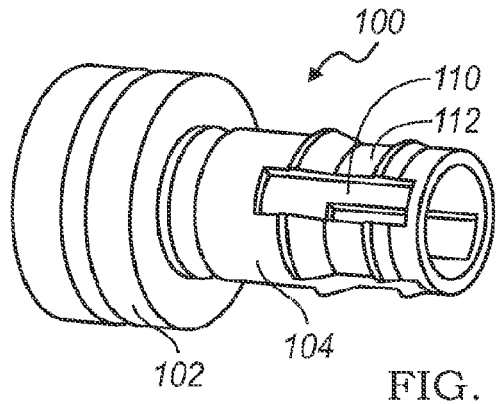
FIG. 15 shows a perspective view of an assembly tool.
Figure 16:
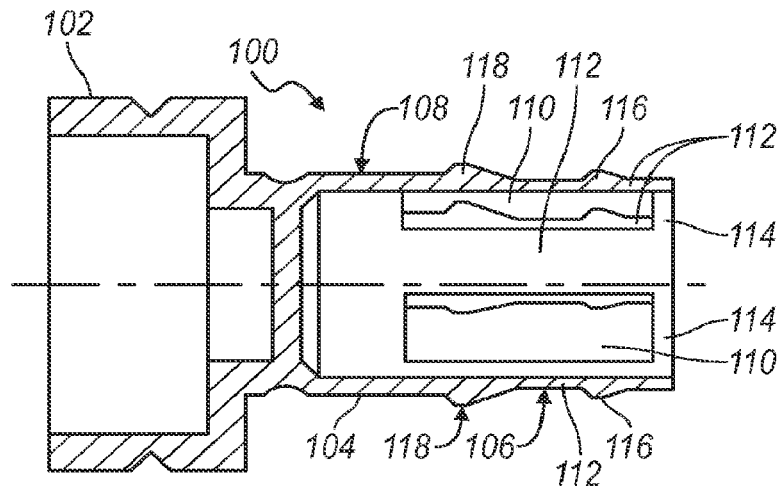
FIG. 16 shows an enlarged axial section through the assembly tool.

A separate tenon-like assembly 100, which is expedient for inserting the internal components into the basic part 18 in a simple way and in the correct position, will also be described with reference to FIGS. 15 to 17.

The assembly tool 100 comprises a gripping portion 102 and a shank portion 104 with holding zones for the components to be inserted. Thus, the shank portion 104 has a first holding zone 106 for the internal circumferential seal 46 and for the clamping ring 8 and also a second holding zone 108 for the insert part 20. According to FIG. 16, in this case, the shank portion 104 is subdivided in regions by longitudinal slots 110 into radially spring-elastic spring arms 112. However, at the free end of the shank portion 104, the spring arms 112 are connected to one another in the circumferential direction via connecting portions 114. The spring arms 112 have, in their regions adjoining the free end pointing in the insertion direction, radial holding bosses 116 for the circumferential seal 46 and, indirectly via the circumferential seal 46, also for the clamping ring 8 and also the insert part 20. As may be gathered from FIG. 17, owing to the radial elasticity of the spring arms 112, first the insert part 20 and subsequently the clamping ring 8 and the circumferential seal 46 can be placed axially onto the shank portion 104.

Figure 17:
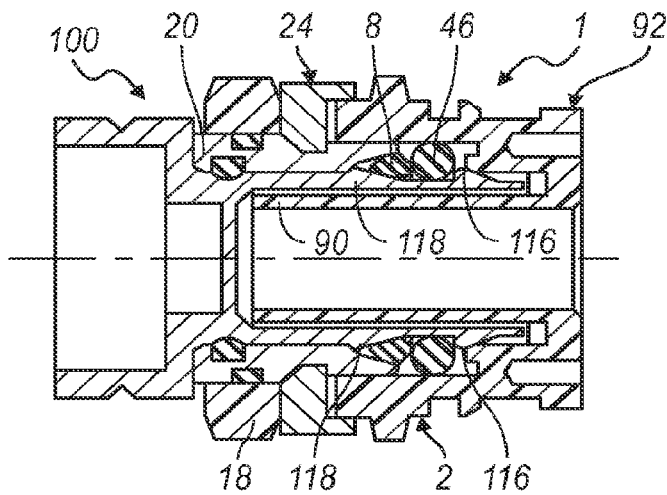
FIG. 17 shows an axial section through the connection device according to the invention with an inserted assembly tool.

In a preferred embodiment, the shank portion 104 has additionally, in the region between the holding bosses 116 and the second holding zone 108 for the insert part 20, radial actuating bosses 118 such that, when the assembly tool 100 or the shank portion 104 is being drawn out of the parts, previously inserted into the basic part 18 according to FIG. 17, via the actuating bosses 118 to be moved through the insert part 20, the spring arms 112 are deformed radially inward to an extent such that the holding bosses 116 can be moved, essentially free of contact and of friction, in particular, through the clamping ring 8 and its tooth edge 58.

It may be noted that an assembly tool of this type having the advantageous functions described is also basically suitable, independently of the connection device 1 according to the invention, for similar applications in which it is important to have a partially contact-free draw-out. Independent protection is therefore also claimed for the assembly tool. The same also applies correspondingly to the individual components (basic part 18, spring clip 24, insert parts 20 and form plug 12) as "replacement parts" for a connection device 1 according to the invention.

The invention is not restricted to the exemplary embodiments illustrated and described, but also embraces all versions having an equivalent effect within the meaning of the invention.

The invention claimed is:

1. A connection device for a plug connection of at least one media line, comprising:
   a housing part having at least one reception orifice for connecting to the at least one media line, the housing part also having a clamping ring which is arranged in the reception orifice and engaged with an inner cone of the housing part for the detention of a plug portion,
   the housing part further including a basic part and an insert part, the insert part releasably connected with a form fit within the basic part via a latching connection, the insert part having the inner cone for engaging the clamping ring, wherein the latching connection holding the insert part releasably within the basic part is formed by a C-shaped spring clip which is manually releasable and seated on an exterior surface of the basic part and which engages with latching extensions radially through orifices on the basic part into a circumferential latching groove of the insert part, so that the insert part is a rotationally symmetrical part which can be inserted in the basic part in any desired rotary orientation;
   wherein the C-shaped spring clip comprises a C-shaped annular portion and two latching extensions lying essentially diametrically opposite one another, the latching extensions having oblique faces on their front sides facing a plug-in side of the reception orifice, in such a way that, when the insert part is being introduced into the basic part, the latching extensions are urged radially outward via the oblique faces and subsequently latch into the latching groove, the connection device being suitable both for direct connection to the at least one media line by a cylindrical line part thereof being plugged into the reception orifice and for indirect connection of a media line via the reception orifice.

2. The connection device as claimed in claim 1, wherein the spring clip is seated with its annular portion in an outer annular groove of the basic part, the latching extensions being designed asymmetrically in relation to the annular groove and to the annular portion in the axial and/or circumferential direction, in such a way that the spring clip can be placed onto the basic part in only one correct orientation with respect to the oblique faces.

3. The connection device as claimed in claim 1, further comprising a securing means configured to prevent radial expansion of the spring clip and an unwanted release of the spring clip in the operating state of the connection device.

4. The connection device as claimed in claim 3, wherein the spring clip has, toward one side of each of the latching extensions, a securing portion which, when an axial releasing pull arises, engages radially and axially behind the orifice of the basic part such that the spring clip is blocked against spreading open radially.

5. The connection device as claimed in claim 1, wherein the insert part has two outer circumferential seals, arranged axially on both sides of the latching groove, for coming to bear sealingly against an inner face of the basic part.

6. The connection device as claimed in claim 5, wherein the insert part, together with the circumferential seals, are formed as a multicomponent molding from plastic.

7. The connection device as claimed in claim 1, wherein the insert part has an inner circumferential seal for coming to bear sealingly on the plugged-in plug portion, the inner circumferential seal being located in a mouth region of the insert part.

8. The connection device as claimed in claim 1, wherein the inner cone of the insert part comprises two axially adjacent inner cone portions with different cone angles, a first inner cone portion remote from the plug-in side and having a first, flatter cone angle and a second inner cone portion following the direction of the plug-in side and having a second, steeper cone angle.

9. The connection device as claimed in claim 8, wherein the clamping ring has two axially adjacent outer cone portions angularly corresponding to the inner cone portions of the insert part.

10. The connection device as claimed in claim 8, wherein the first cone angle lies in the range of 10° to 25°, and the second cone angle lies in the range of 40° to 50°.

11. The connection device as claimed in claim 1, wherein the clamping ring is formed as an annular body of metal, having a continuous slot interruption at one circumferential point and thereby being deformable radially elastically and having a radially inner tooth edge, the diameter of which is smaller than the outside diameter of the plug portion to be plugged in.

12. The connection device as claimed in claim 11, wherein the tooth edge is formed by a tooth profile with a conical front face and with a radial rear face.

13. The connection device as claimed in claim 11, wherein the clamping ring is designed, in cooperation with the inner cone and with respect to its geometry, in the region of the tooth edge, in such a way that the plug portion may be designed selectively with a holding groove for the form-fit engagement of the tooth edge or with a smooth, cylindrical circumferential face for the form-fit or forcible form-fit engagement of the tooth edge.

14. The connection device as claimed in claim 11, wherein the clamping ring has, at least at one circumferential point, an articulation zone formed by a reduction in its ring cross section, for which purpose the clamping ring has in an outer circumferential region three flattenings in an arrangement radially symmetrical with respect to the slot interruption and with respect to one another.

15. The connection device as claimed in claim 1, wherein the clamping ring has, on its rear side pointing in the plug-in direction, a bearing contour with a centering slope for a circumferential seal arranged in the reception orifice so as to come to bear sealingly on the plug portion.

16. The connection device as claimed in claim 15, wherein between the centering slope and an adjoining outer cone portion of the clamping ring, an annular extension prolonging the outer cone portion is formed.

17. The connection device as claimed in claim 15, wherein the centering slope merges radially inward into a radial annular end face.

18. The connection device as claimed in claim 1, further comprising a form plug, having as an integral part, a plug portion configured for receipt within the reception orifice of the housing part, the form plug having a connecting endpiece for connection with the media line thereby forming an indirect connection of the media line to the housing part.

19. The connection device as claimed in claim 18, wherein the plug portion of the form plug has at least one annular groove for the form-fit engagement of the clamping ring.

20. The connection device as claimed in claim 18, wherein the plug portion has two axially offset annular grooves for the engagement of the clamping ring, on the one hand, in a prelatching position and, on the other hand, in a full-latching position, in the prelatching position there being a perceptible leak limited in a defined manner, and in the full-latching position media-tight sealing being ensured.

21. The connection device as claimed in claim 20, wherein in the prelatching position, axial leakage paths are formed between the plug portion and an inner circumferential seal by a zone of the plug portion having at least one axially extending depression.

22. The connection device as claimed in claim 18, wherein the connecting endpiece of the form plug has an endpiece profile with tooth edges, each of the tooth edges having a diameter and each diameter increasing successively from a free end of the connecting endpiece.

23. The connection device as claimed in claim 18, wherein the connecting endpiece has at a free end thereof a short cylindrical portion for simplified insertion into the media line.

24. The connection device as claimed in claim 18, wherein the form plug is designed as an adapter between different dimension systems on the plug-in side and on a media line side.

25. The connection device as claimed in claim 1, further comprising an axial supporting sleeve for forcible engagement into the plugged-in plug portion arranged within the reception orifice.

26. The connection device as claimed in claim 1, wherein the basic part is produced jointly with a supporting sleeve as a one-piece molding from plastic.

27. The connection device as claimed in claim 1, wherein the housing part is designed as a press-in cartridge with a plug-in portion which can be inserted into a connecting orifice of any desired assembly part.

* * * * *